March 24, 1925.
P. P. KUCERA
METHOD OF MANUFACTURING GLASS RODS
Filed June 28, 1924
1,530,728
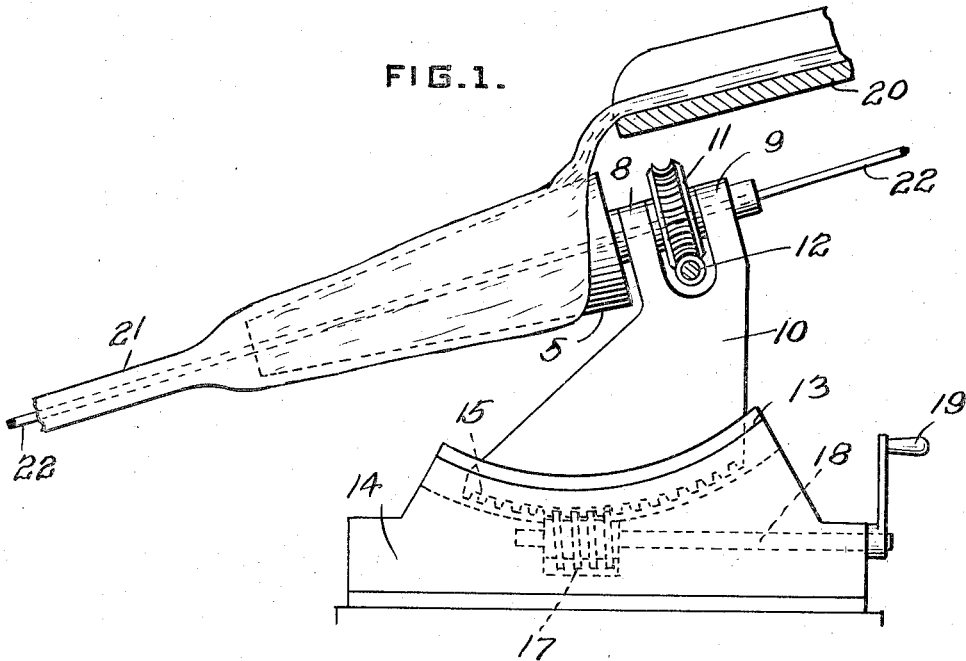
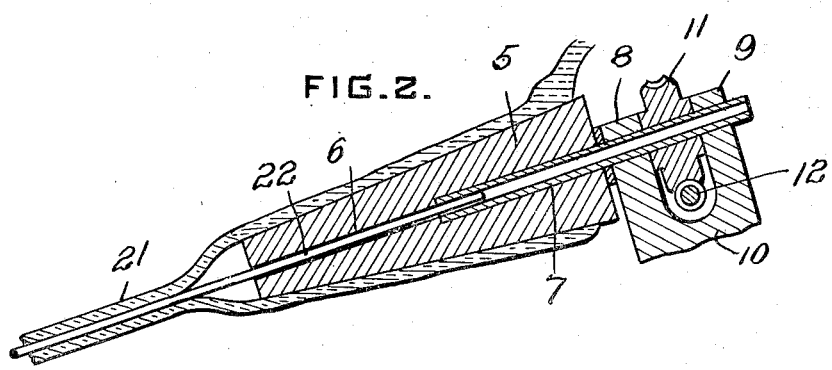
WITNESSES
J. Herbert Bradley.
INVENTOR
Peter P. Kucera
By Green And McCallister
His Attorneys Patented Mar. 24, 1925.

1,530,728

UNITED STATES PATENT OFFICE.

PETER P. KUCERA, OF PITTSBURGH, PENNSYLVANIA.

METHOD OF MANUFACTURING GLASS RODS.

Application filed June 28, 1924. Serial No. 722,894.

*To all whom it may concern:*

Be it known that I, PETER P. KUCERA, a citizen of the United States, and a resident of Pittsburgh, in the county of Allegheny and the State of Pennsylvania, have made a new and useful invention in Methods of Manufacturing Glass Rods, of which the following is a specification.

This invention relates to the manufacture of rods and more particularly to the manufacture of reinforced glass rods.

An object of this invention is to provide an improved and continuous method of making reinforced glass rods.

A further object is to provide a method of making glass rods which will be continuous in operation and simple and cheap to perform.

These and other objects which will be obvious to those skilled in this particular art are attained by means of this invention which is adapted to be preformed by any desired type of apparatus such, for example, as that shown in the drawing, in which Figure 1 is a side elevation of one form of apparatus adapted to carry out the method of the present invention, Fig. 2 is a longitudinal section through a part of the device shown in Fig. 1 and Fig. 3 is a section of a reinforced glass rod made in accordance with this invention.

In carrying out this invention, a mass of molten glass is made to assume an annular form. Glass from the annular mass is continuously drawn in the form of a rod therefrom and reinforcing wire is supplied to the interior of the rod during drawing. The method is continuous and may be carried on indefinitely.

The apparatus which is illustrated in the drawing as being adapted to carry out the method of the present invention includes an inclined rotary mandrel 5 made of any desired refractory material and provided with an opening 6 extending along the axis thereof from end to end. The mandrel is mounted on one end of a hollow supporting tube 7 which extends outwardly beyond the upper end of the mandrel. The projecting end of the supporting tube 7 is journaled for rotary movement in spaced bearing members 8 and 9 formed on a suitable support 10. A worm wheel 11 is rigidly mounted on the supporting tube 7 between the bearing members 8 and 9 and is adapted to be driven by a worm 12 which is operated from any suitable source of power (not shown) so as to impart rotation through the supporting tube 7 to the inclined mandrel 5.

The support 10 is sildably supported on arcuate surfaces 13 formed on a base member 14. A segmental rack 15 is formed on the bottom of the support 10 and engages a worm wheel 17 mounted on a shaft 18 which extends outwardly beyond the base 14 and is adapted to be rotated by a suitable handle 19 for the purpose of adjusting the degree of inclination of the rotating mandrel 5.

Molten glass from any desired source, such as the spout 20 of a glass furnace, is permited to flow onto the upper enlarged end of the rotating mandrel 5. Adherence of the molten glass to the surface of the rotating mandrel causes it to surround and envelop the same and flow downwardly toward the discharge end under the influence of gravity. The glass is drawn off the lower end of the mandrel in the form of a rod 21. The drawing of the rod is started in the first place by means of a "bait" to which the glass adheres, as is well known in this particular art. Movement of the bait away from the mandrel causes the glass to be drawn after it in cylindrical form. When the drawing is started a reinforcing wire 22 is fed through the hollow tube 7 and the opening 6 in the mandrel 5 until it is enveloped by and gripped by the rod 21 being drawn. The adherence of the plastic glass to the reinforcing wire causes the latter to be continuously drawn therewith. When the glass is cooled sufficiently it may be cut to desired lengths without interrupting the continuity of the drawing operation.

With a given drawing speed the size of the rod formed may be varied by controlling the rate of flow of the molten glass along the rotating mandrel 5 merely by changing the degree of inclination of the mandrel through the medium of the rack and worm 15 and 17. With a comparatively steep inclination the glass will flow along the mandrel more rapidly and the finished rod will have a greater diameter, the reverse being the case when the inclination of the mandrel is relatively slight. Of course, the size of the finished rod will also vary in accordance with the speed of drawing. A steep inclination of the mandrel requires a more rapid flow of glass from the spout 20 to accommodate the increased flow along the mandrel.

Instead of drawing a single continuous reinforcing wire with the glass rod a plurality of individual wires of predetermined length may be successively fed through the mandrel 5 and drawn with the glass. A small space is left between the ends of the successive pieces of wire, as shown in Fig. 3, so that the cutting or breaking of the finished rod to lengths can be performed between the individual lengths of reinforcing wire. This does away with the necessity of cutting through the wire and permits the formation of the desired lengths by merely fracturing the glass between the individual lengths of wire.

Although I have described a specific form of apparatus which is particularly adapted to carry out the method of the present invention, various other forms will be obvious to those skilled in this particular art.

What I claim as new and desire to secure by Letters Patent is:

1. The method of forming reinforced glass rods which consists in passing a reinforcing means through a mass of molten glass and drawing a rod around said reinforcing means from the mass of molten glass.

2. The method of forming reinforced glass rods which consists in passing a wire through a mass of molten glass and drawing a rod around the wire from the mass of molten glass.

3. The method of forming reinforced glass rods which consists in passing a wire through a mass of molten glass and simultaneously drawing a rod around the wire from the mass of molten glass.

4. The method of continuously forming reinforced glass rods which consists in providing an annular mass of molten glass, passing a wire through the annular mass and continuously drawing a rod around the wire from the annular mass.

5. The method of forming reinforced glass rods which consists in flowing molten glass along a rotating support, passing reinforcing means longitudinally of the support and drawing a rod around the reinforcing means from the molten glass.

6. The method of continuously forming reinforced glass rods which consists in flowing molten glass along a rotating support, passing a wire longitudinally of the support and drawing a rod around the wire from the molten glass at one end of the support.

7. The method of continuously forming reinforced glass rods which consists in flowing molten glass along a hollow rotating support, passing a wire through the support and drawing a rod around the wire from the glass at one end of the support.

8. The method of continuously forming reinforced glass rods which consists in flowing molten glass along a hollow rotating support, controlling the rate of flow of the molten glass, passing a wire through the support and drawing a rod around the wire from the molten glass at one end of the support.

9. The method of continuously forming reinforced glass rods which consists in flowing molten glass along a hollow rotating support, controlling the rate of flow of the molten glass passing a rod longitudinally through the support and drawing a rod around the wire from the molten glass at one end of the support.

In testimony whereof, I have hereunto subscribed my name this 26th day of June, 1924.

PETER P. KUCERA.